United States Patent [19]

Wilson

[11] Patent Number: 5,844,236

[45] Date of Patent: Dec. 1, 1998

[54] MULTI-WAVELENGTH OPTICAL DRIVE/ SENSE READOUT FOR RESONANT MICROSTRUCTURES

[75] Inventor: Mark Lowell Wilson, Vadnais Heights, Minn.

[73] Assignee: Honeywell Inc., Minneapolis, Minn.

[21] Appl. No.: 785,494

[22] Filed: Jan. 17, 1997

[51] Int. Cl.[6] .................................................. G01J 1/04

[52] U.S. Cl. .............................. 250/227.14; 250/227.19; 385/46

[58] Field of Search .................. 250/227.19, 227.14, 250/214 R; 385/46; 356/349

[56] References Cited

U.S. PATENT DOCUMENTS

| | | | |
|---|---|---|---|
| 4,552,457 | 11/1985 | Giallorenzi et al. | 250/227.19 |
| 5,387,791 | 2/1995 | Weiss | 250/227.14 |
| 5,559,358 | 9/1996 | Burns et al. | |

FOREIGN PATENT DOCUMENTS 0298598A  1/1989  European Pat. Off. .

OTHER PUBLICATIONS

M.Wilson, D.Burns, J.Zook, "An Optical Network of Silicon Micromachined Sensors," *Proceedings of SPIEE*, vol. 2687, pp. 78–88, Jan. 30, 1996.

T.Kvisteroy, O.Henrik Gusland, B. Stark, H. Nakstad, M. Eriksrud, B.Bjornstad, "Optically Excited Silicon Sensor for Permanently Installed Downhole Pressure Monitoring Applications," *Sensors and Actuators*, A31, pp. 164–167, 1992.

D.W.Burns, W.R.Herb, J.D.Zook, M.L. Wilson, "Optically Driven Resonant Microbeam Temperature Sensors for Fiber Optic Networks," *Solid–State Actuator Workshop*, Jun. 2, 1996.

M.Wilson, D.Burns, J.D.Zook, "Distributed Micromachined Sensor Network," *Proceedings of SPIEE*, vol. 3077, pp. 92–98, Feb. 13, 1997.

*Primary Examiner*—Edward P. Westin
*Attorney, Agent, or Firm*—Ian D. MacKinnon

[57] ABSTRACT

A method of driving and sensing a resonant sensor network wherein a least a one resonant sensor is driven by a first light from a first light source at a first frequency, wherein said first light source is modulated by an a.c. source. A second light source at a second frequency is utilized sense the resonant frequency of the at least one resonant sensor. Wherein said at least one resonant sensor modulates said second light source. The modulated light is provided to a photo detector and the first light source is filtered out of said reflected light. The detector ac amplifies the filtered reflected light, thereby detecting said the resonant frequency of the resonant sensor.

19 Claims, 8 Drawing Sheets

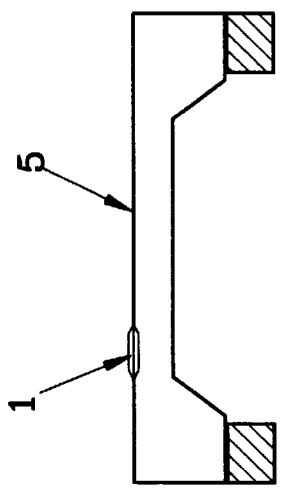
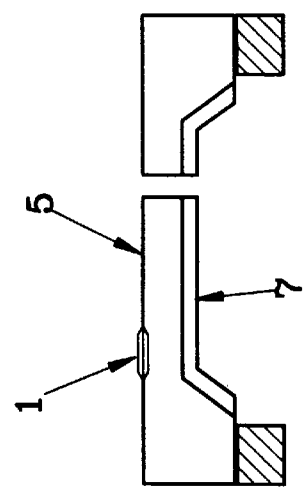
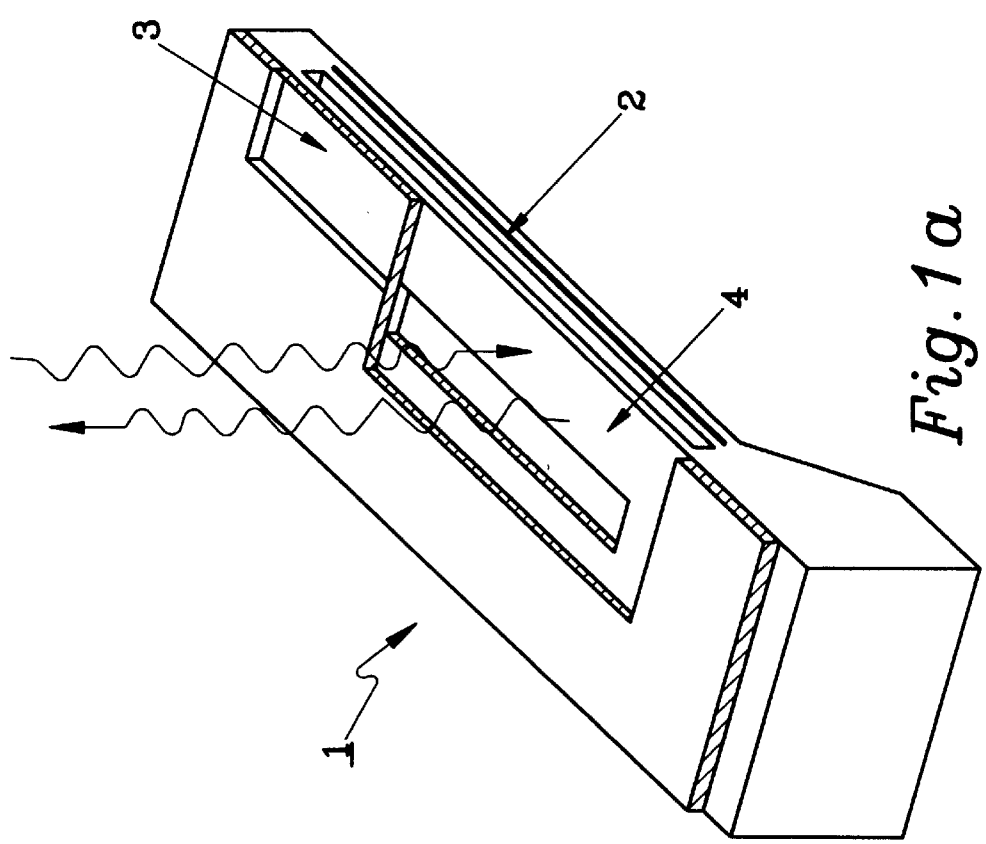
Fig. 1a
Fig. 1b
Fig. 1c

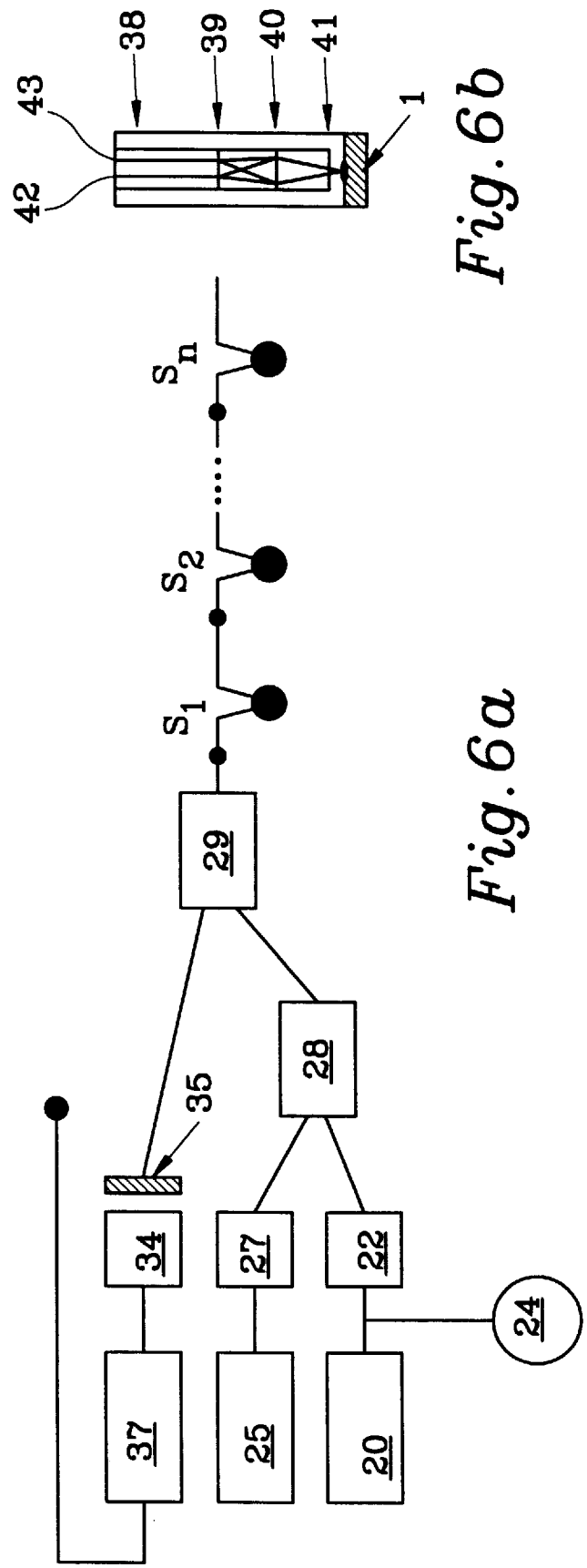

MULTI-WAVELENGTH OPTICAL DRIVE/ SENSE READOUT FOR RESONANT MICROSTRUCTURES

The Government has rights to this invention pursuant to Contract No. DAAL01-94-C-3427 awarded by the Department of the Army.

FIELD OF THE INVENTION

This invention is in the field of optical drive/sense for resonant microstructures. More specifically this invention is in the field of optically driving and sensing resonant microstructures with reduced levels of noise on the sensed signal.

BACKGROUND OF THE INVENTION

The sensing element of a resonant sensor is a polysilicon microbeam attached at one or both ends. A detailed description of the resonant sensor can be found in U.S. Pat. No. 5,559,358 issued to Burns et. al. and hereby incorporated by reference. This microbeam is free to vibrate in and out of the plane of the microbeam and is surrounded by a vacuum enclosure. The enclosure is fabricated monolithically and provides a vacuum environment for the microbeam to vibrate at its natural resonant frequency (100 kHz–900 kHz) with relatively low losses and high Q.

Each microbeam contains an embedded photodiode fabricated beneath the beam. A modulated laser input is used to illuminate this photodiode, which generates an electrostatic force which attracts the microbeam and drives the beam into resonance. The natural frequency of the sensor is designed to be controlled by an external parameter such as pressure or temperature that the sensor is to monitor. Light reflected from the resonating sensor will be modulated at the resonant frequency and monitored externally. Multimode optical fibers are used to route the drive and sense optical signals to and from the sensor.

For the preferred embodiment, the polysilicon resonant microbeam structures have a built-in Fabry-Perot interferometer that offers significant advantages over other configurations described in the literature. Because the interferometer is an integral part of the structure, the placement of the fiber becomes less critical, and packaging issues become considerably simpler. The interferometer spacing are determined by the thin-film fabrication processes and therefore can be extremely well controlled. The integral vacuum cavity that ensures high Q values. The high Q means that very little energy is required to drive the beam at resonance.

To drive these sensors a modulated laser is sent through a fiber-optic cable and resonates the sensor. As light from the drive laser passes through the fiber-optic cable it is reflected by numerous imperfections in the system. This noise makes it difficult to utilize for sensing of the resonant frequency of the sensor. Further, when networked sensors are utilized the noise factor increases drastically. Applicants invention has demonstrated decreases the noise floor of −60 dB and an increase in the signal to noise ratio of over 20 dB (100x). By utilizing applicants invention, large networks of sensors are possible without the severe problems from noise exhibited by the prior art.

SUMMARY OF THE INVENTION

The two embodiments are illustrated,: the first utilizing a star bus network and the second utilizing a lightly tapped linear bus. These designs are explained further in the detailed description of the preferred embodiment. The invention reduces noise found on the sensed signal significantly through the use of separate drive and sense optical sources.

The advantage of a linear tapped bus is that a single fiber can be used to connect up the entire network. However, this can also be a disadvantage if the fiber is damaged or broken since all sensors down stream from the break would no longer function. The star bus has the advantage that the signal levels are higher and there is no single point failure mechanism except if the star coupler is damaged. A doubly redundant star could provide more fault tolerance but also doubles the network complexity.

The reflected power from either the linear tapped or star bus approaches is much larger than the signal power. This is because the modulated light that is used to drive a particular sensor will reflect off all other devices as well as breaks in the fiber such as connectors. All of this reflected light would make direct detection of the small signal power very difficult. Applicants invention eliminates this problem. The modulated laser will drive a particular sensor into resonance as its modulation frequency is swept by the correct frequency. The resonating sensor will modulate the intensity of a second CW laser with a different wavelength. The modulated sense laser is then passed back to the photo detector. A filter in front of the photo detector will eliminate all signals from the drive laser allowing only the sense lasers wavelength to pass by. All reflections from connectors and non-resonating sensor will be DC with no significant AC signal. Only the one device that is actually moving will cause an AC signal. Thus a simple AC coupled amplifier processing the filtered photo diode signal will eliminate the unwanted reflected signals.

Incorporating the invention into a networked array of sensors allows for a greater ability to utilize an increased number of sensors on a given network. Since each sensor would have a separate, non-overlapping frequency, noise from the multiple sensors is eliminated.

BRIEF DESCRIPTION OF THE DRAWING

FIG. 1a illustrates the sectional view of a resonant sensor, showing a microbeam and vacuum cavity.

FIG. 1b illustrates the side view of a resonant pressure sensor.

FIG. 1c illustrates the side view of a resonant temperature sensor.

FIG. 5a illustrates the block diagram for the construction of the star bus network.

FIG. 5b illustrates a connecting method for the system as shown in FIG. 5a.

FIG. 6a illustrates the block diagram for the construction of a lightly tapped linear bus network.

FIG. 6b illustrates the connecting method for the sensor for system configured as shown in FIG. 6a.

DESCRIPTION OF THE PREFERRED EMBODIMENT

Figure 2:
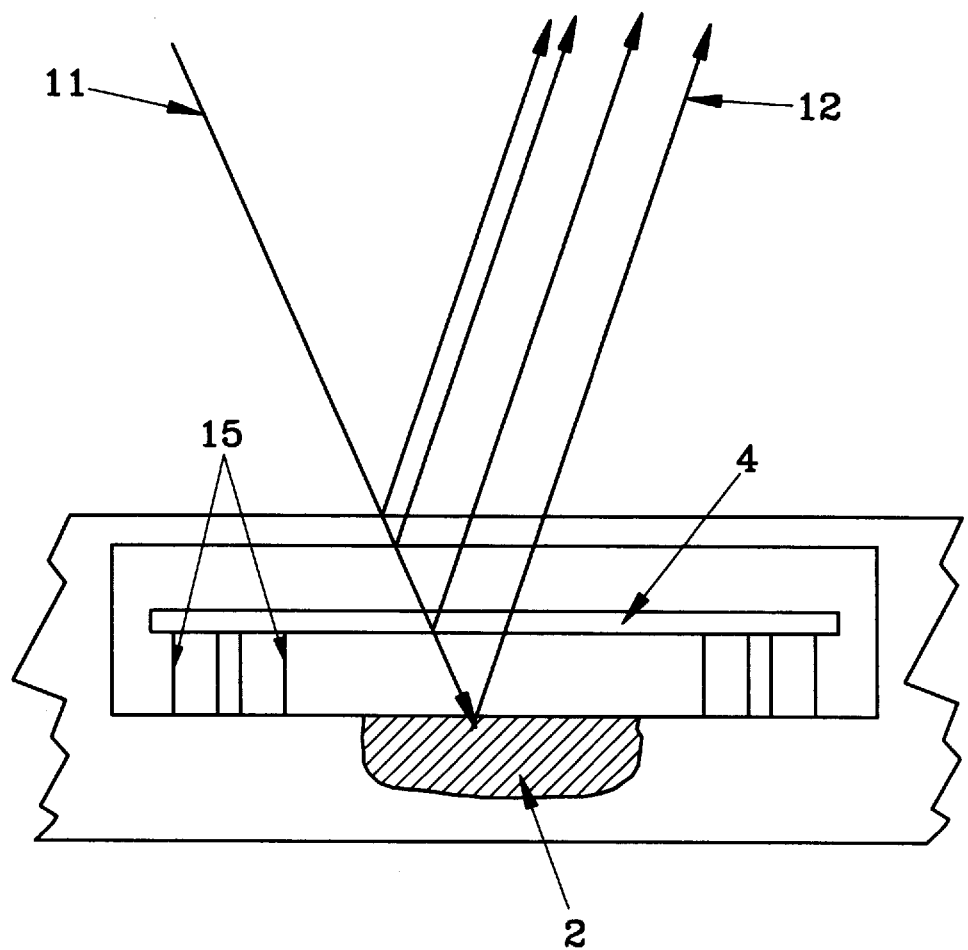
FIG. 2 illustrates the light patterns for a resonant microbeam sensor.

FIG. 1a–FIG. 1c illustrates microbeam sensor 1 utilized in pressure sensor and temperature sensor application. Each microbeam contains an embedded photo diode 2 which is fabricated beneath microbeam 4. The modulated laser input is used to illuminate photo diode 2 which generates an electrostatic force which attracts microbeam 4 and drives beam 4 into resonance. Microbeam sensor 1 utilized for the preferred embodiment further comprises a vacuum cavity enclosure 3. A detailed description of microbeam sensor 1 on its operation can be found in U.S. Pat. No. 5,559,358 issued to Burns et. al. and hereby incorporated by reference.

FIGS. 1b and 1c illustrate where microbeam 1 is located for a pressure sensor as illustrated in FIG. 1b and a temperature sensor as illustrated in FIG. 1c. For the pressure sensor illustrated in FIG. 1b, microbeam 1 is located on the top of a silicon diaphragm 5 wherein the pressure sensor is able to sense pressure differences applied to the silicon diaphragm. FIG. 1c illustrates a temperature sensor in which the silicon diaphragm 5 is cantilevered and a TCE mismatched material 7 is applied to the bottom surface of silicon diaphragm 5.

FIG. 2 illustrates how light is reflected off the resonant microbeam and surrounding structure. Incident light 11 is directed at photo diode 2 and passes through microbeam 4. The light is reflected by the five surfaces and returns as reflected light 12. The movement of the microbeam 4 causes modulation of the reflected light indicating the current resonant frequency of the microbeam 4. Reflections from the top of the polysilicon shell are made negligible by the use of anti-reflective coating. The thickness of the cavity above and below microbeam 4 are chosen such that their sum is a half wavelength of the incident light and microbeam 4 is chosen to be an odd multiple of a quarter wave thickness. When the lower gap is zero or a multiple of a half wave thick the structure is anti reflecting. When the lower gap is an odd multiple of a quarter wave thick the reflectivity is twice the reflectivity of bare silicon or about 66 percent of the normal incidence. Multiple reflection affects give the structure Fabry-Perot like characteristics with an effective finesse of about 3.7.

Figure 3:
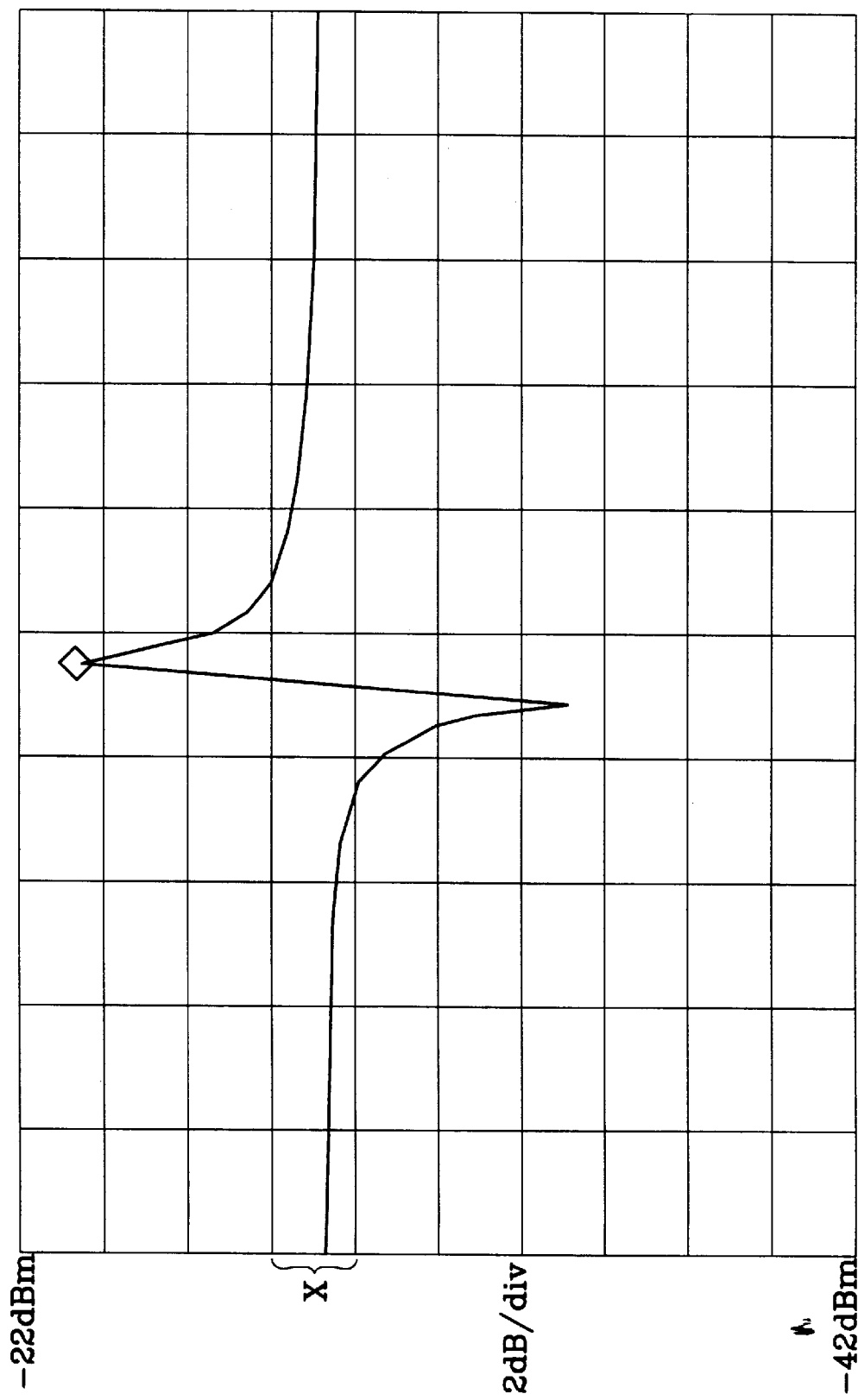
FIG. 3 illustrates the signal spectrum for the sensed laser signal utilizing the prior art system.
Figure 4:
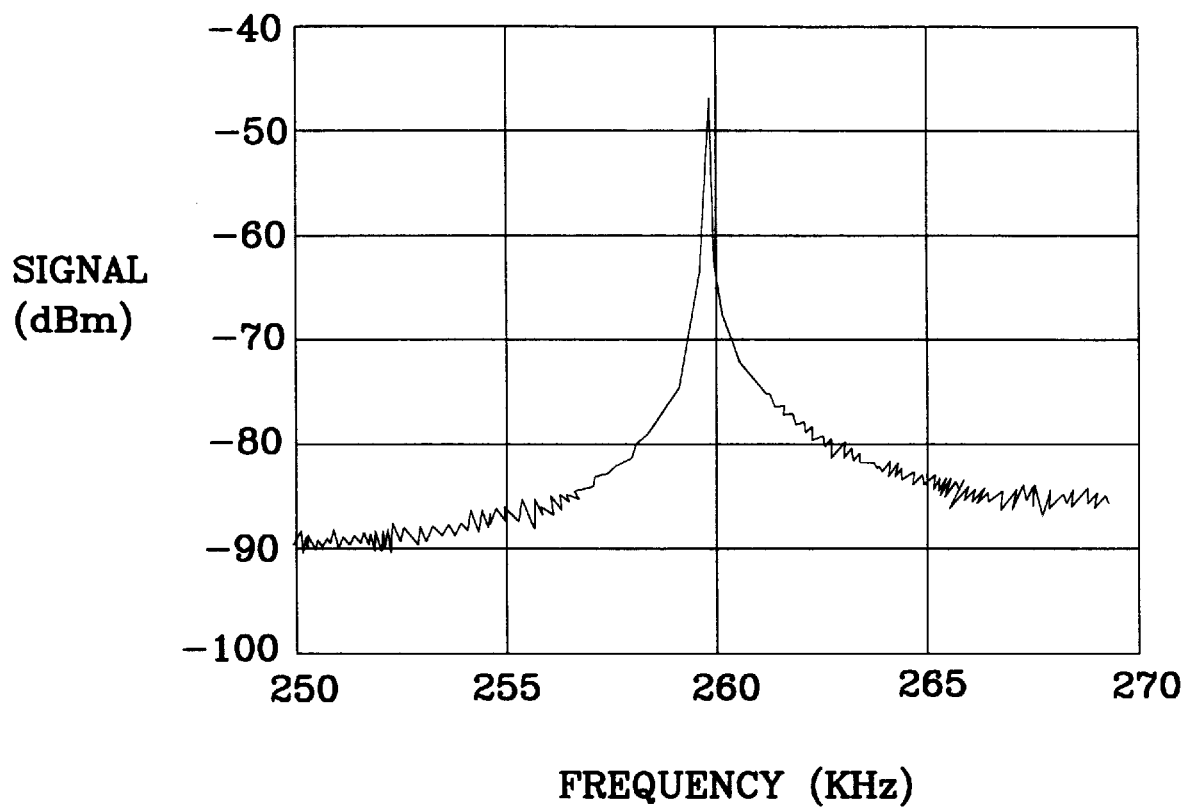
FIG. 4 illustrates the frequency spectrum for the sensed signal utilizing the invention.

When attempting to optically sense the resonant frequency of a resonant micro structure such as those disclosed in FIGS. 1 and 2, background reflection signals can easily swamp out low level return signals especially in large sensor networks. The new drive/sense method improves the overall performance, reduces system noise and has made it possible to develop large sensing networks. FIG. 3 illustrates the signal from a drive/sense system without the new drive/sense method. Note the signal is +10 dB above the noise floor, and that the noise floor is at −29 dBm. FIG. 4 is the same device readout incorporating the new drive/sense method. The noise floor is nearly −90 dBm and the signal is over 30 dB above the noise floor. Therefore, the noise floor has decreased by nearly 60 dB and the signal is over 20 dB (100×) higher.

FIG. 5 illustrates the invention when incorporated for use with a star network. DC source 20 provides power to drive laser 22 which is modulated by AC source 24. Laser 22 drives sensors $S_1$ through $S_N$. DC supply 25 drives laser 27 which operates at a different wavelength than laser 22. Lasers 27 and 22 are coupled to sensors $S_1$ through $S_N$ through star coupler 30. Star coupler 30 is an N×N star coupler. Star coupler 30 further provides the reflected light from sensors $S_1$ through $S_N$ to detector 34. The reflected light returned by star coupler 30 is filtered by band pass filter 35 such that detector 34 only receives light at the frequency of the sensed laser 27. Detector 34 senses the modulated frequency and provides it to a.c. amplifier 37. A.C. amplifier 37 amplifies only the a.c. signal that was passed to it which due to band pass filter 35 is only the modulated frequency of sense laser 27. As a.c. amplifier does not amplify the d.c. components of sense laser 27 the reflected noise on laser 27 is eliminated. A-C. amplifier 37 then provides the amplified signal to a signal processor which is utilized to calculate the current resonant frequency of sensors $S_1$ through $S_N$. A star coupler is utilized in this embodiment as the star coupler distributes the laser evenly to the sensors and further is more fault tolerant than other methods.

In the prior art method and the new drive/sense method, light from laser 22 which is modulated in order to drive photo diode 2 is reflected back by the star coupler, bad connectors, open links and other sensors. In the new drive/sense method, light from laser 27 is not modulated until it reaches sensors $S_1$ through $S_N$, wherein the resonant frequency of the microbeam modulates the reflected light of laser 27. Reflections from non-resonant sensors, fiber connectors, and other sources cause a DC signal on the photo diode 34 which can be eliminated by AC coupling to an amplifier. Only the AC signal from the resonant sensor is amplified and processed. Thereby reducing the noise on the system.

Figures 5A, 5B:
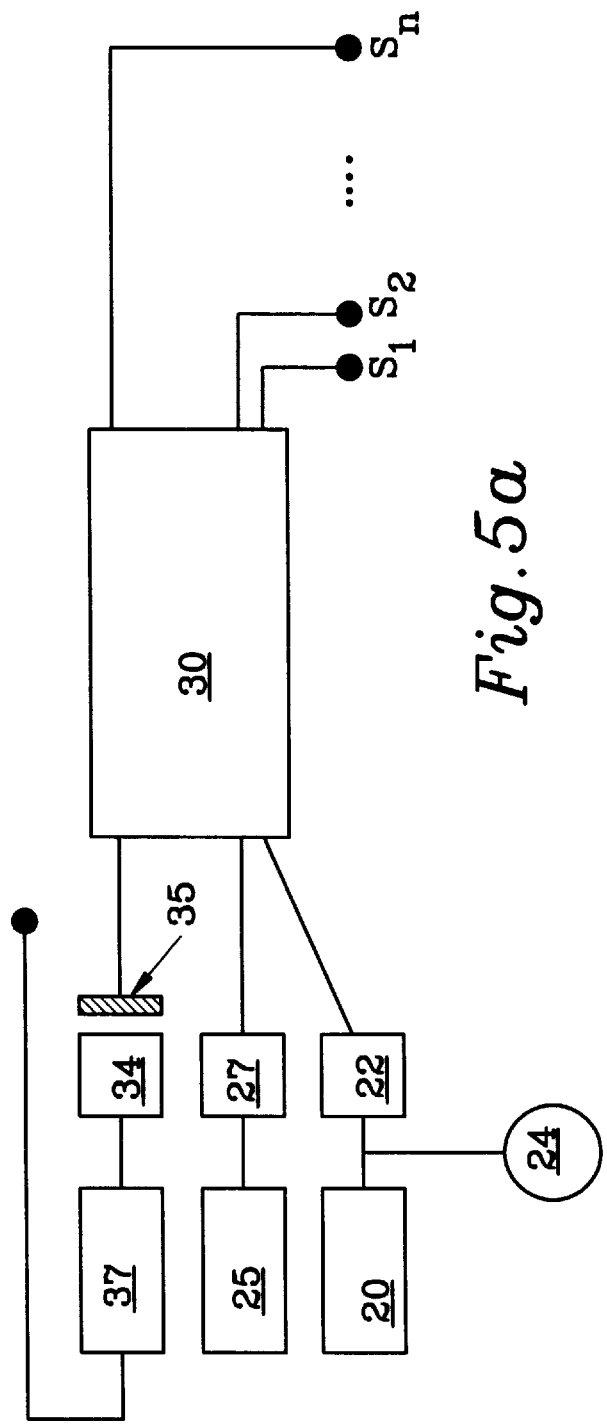

FIG. 5b illustrates the connecting method to connect the sensors for the embodiment of FIG. 5. The fiber is held into alignment with microbeam 1 utilizing ferrule 38. This method is well know in the art.

FIG. 6 illustrates the new drive/sense method when utilized on a lightly tapped linear network. The advantage of a lightly tapped linear network is that it requires only one fiber optic line be laid and multiple sensors can be tapped onto the network. The operation of the lightly tapped linear network is similar to that of the star coupler in that it comprises DC driver 20, 25 and amplifier 37 along with detector 34 and band pass filter 35. Laser 22 is still utilized to drive sensors $S_1$ through $S_N$ and a second laser 27 is utilized to sense the resonant frequency of sensors $S_1$ through $S_N$. All lasers 22, 27 and photo detector 34 are connected to the linear network using output port 46 of a N×N coupler 30. The minimum size of the N×N coupler 30 would be a 3×3. Each of the sensors $S_1$ through $S_N$ must resonate at separate non-overlapping resonant frequencies to eliminate complications as to which sensor is reporting in. 3D couplers 28 and 29 are utilized to route the optical signals.

FIG. 6b illustrates how sensors 1 are connected to the lightly tapped linear array. Two optical fibers 42 and 43, are connected to each sensor so that the optical energy not used by the immediate sensor, can be routed down the line to the next sensor. Each of these two fibers 42 and 43, are held into precise alignment using a ferrule 38. Lens 39 collimates the optical energy incident from fiber 42 and directs the collimated beam of optical energy toward a partial mirror 40 which reflects 95 to 98% of the incident energy toward the second fiber 43 which then routes the optical energy down the line to the next sensor, or to the network terminator 44 which disposes of all unused optical energy. The 2 to 5% optical energy which passes through the partial mirror 40 is focused onto the micromachined silicon sensor chip 1 using a second lens 41. Modulated optical signals reflect off of the sensor chip 1 and then pass through 41, 40, and 39 and then are coupled back into fiber 42. These signal continue back through the network till they enter the N×N star coupler 30 which directs some of the optical energy toward band pass filter 35 and photo detector 34 for signal processing.

Figure 7:
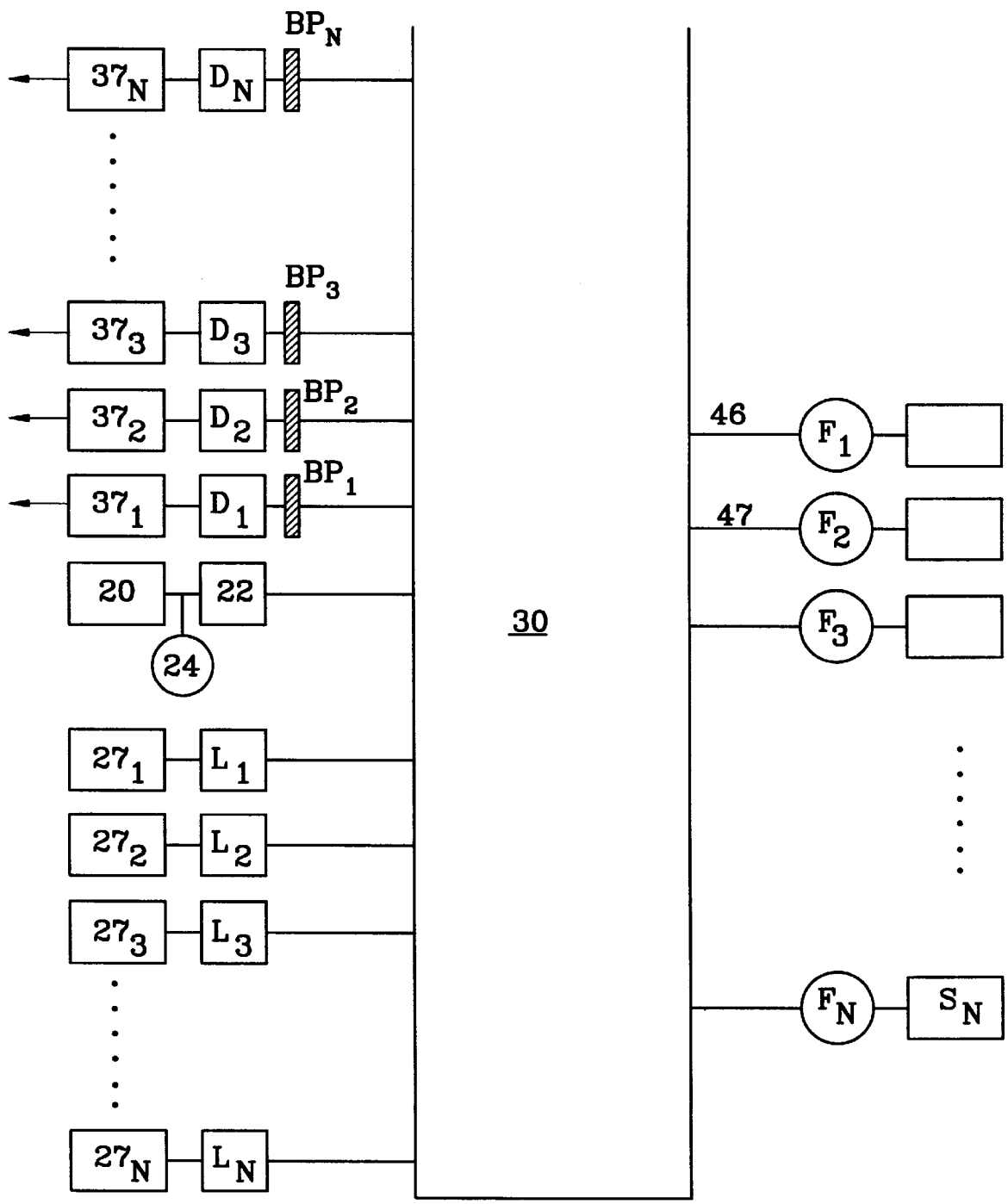
FIG. 7 illustrates the block diagram for the construction of a multiple sensor star bus network.

A third embodiment of the new drive/sense method is incorporated in FIG. 7. In FIG. 7 laser 22 is utilized to drive sensors $S_1$ through $S_N$ into resonance. In this embodiment multiple sense lasers $L_1$ through $L_N$ are utilized. In this embodiment sensors $S_1$ through $S_N$ have incorporate dual band pass filter $F_1$ through $F_N$ which are dual band pass filters passing the light of drive laser 22 and the corresponding sense laser $L_2$ through $L_N$. This additional capability is added to the sensor network by using Wavelength Division Multiplexing (WDM) techniques. By employing WDM techniques, it is possible to have a single drive laser 22, but multiple sense lasers $L_1$=$L_N$. Thus the same sensor chip 1 with the same resonant frequency can be used multiple times allowing the number of sensors on the network to be increased. One example of this implementation, a WDM filter $F_1$ is inserted in between the output port 46 of N×N star coupler 30. This WDM filter is designed to allow 100% of the optical power at the drive lasers 22 wavelength, and 100% of the optical power of a single sense laser wavelength $L_1$ to pass through to sensor $S_1$. The WDM filter $F_1$ blocks all of the optical power from other sense lasers. Similarly, a second WDM filter $F_2$ is connected to output port 47 of N×N star coupler 30. This WDM filter is designed to allow 100% of the optical power at the drive laser 22 wavelength, and 100% of the optical power of a second sense laser $L_2$ to pass through toward a second sensor $S_2$. The WDM filter $F_2$ blocks all of the optical power from other sense lasers. The resonant signal from the second sensor $S_2$ passes through the N×N star coupler 30 and is then coupled through a second band pass filter $BP_2$ to a second photo detector $D_2$ for signal processing. The reflected light is transmitted back to detectors $D_1$ through $D_N$, where $D_1$ through $D_N$ have band pass filters $BP_1$–$BP_N$ which only pass light at the appropriate senses lasers frequency. By incorporating band pass and dual band pass filters a large network of sensors is possible with individual detection of the resonant frequency of each micro beam possible without losses due to noise as found in the prior art. It should be noted that it is not necessary to have a separate laser for each sensor. It should also be noted that if tunable band pass filters are utilized, it is possible to use only one detector by tuning band pass filter to pass each of the sense laser frequencies individually to the detector.

As fiber optic cables are capable of carrying unlimited numbers of laser signals at different frequencies without interference, it is possible utilizing this new drive/sense method to build large sensor networks. The demonstrated decrease in the noise floor and the increase in signal to noise ratio illustrates a vast improvement over prior art methods.

Figure 8:
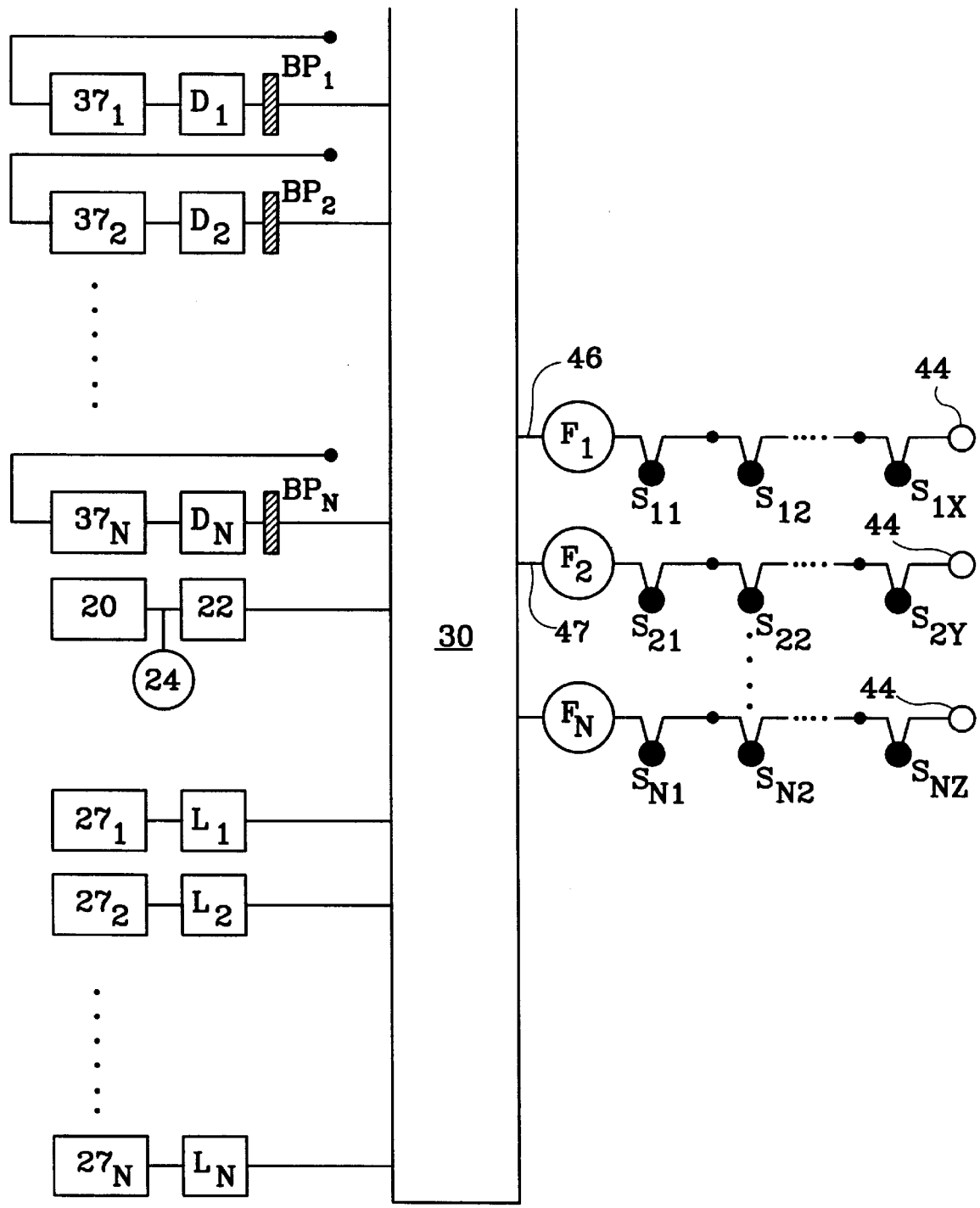
FIG. 8 illustrates the block diagram for the construction of a star bus network comprising multiple lightly tapped linear bus networks.

In a some what more elaborate implementation, FIG. 8 illustrates, multiple linear networks connected up to the N×N star coupler 30 using some of the unused output ports as illustrated in FIG. 8. In the discussion of FIG. 6, a linear network was connected up to output port 46 of the N×N star coupler 30. A second linear network can be connected up to the N×N star coupler 30 using another output port 47 as well as other output ports available on the coupler 30. All sensors connected using this method would still have to have separate non-overlapping resonant frequencies to eliminate complications as to which sensor is reporting in.

The embodiment of FIG. 8 incorporates the techniques of both FIGS. 6 and 7. Each of the lightly tapped networks is connected to a WDM filter as described above. As an example WDM filter $F_1$ is inserted between output 46 and the lightly tapped network comprising sensors $S_{11}$ through $S_{1X}$. Similarly WDM filter $F_2$ is inserted between output 47 and the lightly tapped network comprising sensors $S_{21}$ through $S_{2Y}$. Following the principles of this embodiment large networks of sensors can be designed.

This method allows sensor chips with the same resonant frequency to be used several times in the network reducing the number of sensor chips that need to be manufactured, and increasing the number of sensors that can be connected up to the network. Each WDM sense channel would require a corresponding sense laser, band pass filter, and photo detector.

I claim:

1. A drive/sense network comprising;

at least one resonant sensor;

a drive laser for driving said at least one resonant sensor into resonance;

a sense laser, said sense laser being at a different wavelength than said drive laser, said sense laser is modulated by said at least one resonant sensor, a band pass filter for passing the modulated sense laser;

a detector for detecting the modulated frequency of the sense laser, said detector receiving the modulated sense laser from said band pass filter.

2. The drive/sense network of claim 1 wherein said drive/sense network further comprises:

a lightly tapped linear network, said lightly tapped linear network comprises said at least one resonant sensor, wherein said at least one resonant sensor is a plurality of resonant sensors, where in each of said resonant sensors is driven into resonance by said drive laser and each of said resonant sensors modulates said sense laser.

3. The drive sense network of claim 2 wherein each of said resonant sensors has a non-overlapping resonant frequency.

4. The drive/sense network of claim 1 further comprising a star coupler wherein said star coupler couples said at least one resonant sensor, said drive laser, said sense laser, and said band pass filter.

5. The drive/sense network of claim 4 wherein said at least on resonant sensor is a plurality of resonant sensors, wherein each of said resonant sensors is coupled to said star coupler, wherein each of said resonant sensors is driven into resonance by said drive laser and each of said resonant sensors modulates said sense laser.

6. The drive/sense network of claim 5 wherein each of said resonant sensors has a non-overlapping resonant frequency.

7. The drive/sense network of claim of claim 5 further comprising a plurality of sense lasers and a plurality of dual band pass filters, wherein each of said plurality of dual band pass filters are coupled between said N×N star bus and one of said plurality of sensors, each of said dual band pass filters passing said drive laser and a predetermined sense laser.

8. A drive/sense network comprising:

a drive laser;

a plurality of sense lasers;

a plurality of lightly tapped linear networks coupled with said drive laser and said plurality of sense lasers, each of said lightly tapped linear networks comprising a plurality of resonant sensors; and a detector coupled to said plurality of lightly tapped linear networks, wherein said plurality of resonant sensors modulate a predetermined sense laser, said modulated sense laser is provided to said detection means, wherein said detection means detects the resonant frequency of the resonant sensor from the modulated sense laser.

9. The drive/sense network of claim 8 wherein each of said plurality of linear networks further comprises a dual band pass filter, said dual band pass filters being coupled between said drive laser, said sense lasers and said plurality of resonant sensors for each of said lightly tapped networks, wherein said dual band pass filters pass said drive laser and said predetermined sense laser.

10. The drive/sense network of claim 9 wherein each of said sense lasers is at a different wavelength than said drive laser and are at non-overlapping wavelengths.

11. The drive/sense network of claim 8 wherein a plurality of said resonant sensors are coupled to their respective lightly tapped networks through a dual band pass filter, wherein said dual band pass filter passes said drive laser and said predetermined sense laser.

12. The drive/sense network of claim 11 wherein each of said sense lasers is at a different wavelength than said drive laser and are at non-overlapping wavelengths.

13. The drive/sense network of claim 10 wherein said detector comprises a tunable band pass filter, said tunable band pass filter coupled to said plurality of lightly tapped networks, said tunable band bass filter tunable to pass each of said plurality of sense lasers individually.

14. The drive/sense network of claim 13 wherein said detector further comprises a photo detector and an a.c. amplifier.

15. The drive/sense network of claim 12 wherein said detector comprises a tunable band pass filter, said tunable band pass filter coupled to said plurality of lightly tapped networks, said tunable band bass filter tunable to pass each of said plurality of sense lasers individually.

16. The drive/sense network of claim 15 wherein said detector further comprises a photo detector and an a.c. amplifier.

17. The drive/sense network of claim 10 wherein said detector comprises a plurality of band pass filters, a plurality of photo detectors, and a plurality of a.c. amplifiers, wherein each of said band pass filters is coupled said plurality of lightly tapped linear networks, each of said band pass filters passing said predetermined sense laser to a corresponding photo detector, said photo detector providing a signal corresponding to said sensed laser to an a.c. amplifier.

18. The drive/sense network of claim 12 wherein said detector comprises a plurality of band pass filters, a plurality of photo detectors, and a plurality of a.c. amplifiers, wherein each of said band pass filters is coupled said plurality of lightly tapped linear networks, each of said band pass filters passing said predetermined sense laser to a corresponding photo detector, said photo detector providing a signal corresponding to said sensed laser to an a.c. amplifier.

19. A method of driving and sensing a resonant sensor network comprising the steps of:

driving a least a one resonant sensor with a first light source at a first frequency, wherein said first light source is modulated by an a.c. source;

providing a second light source at a second frequency to said at least one resonant sensor wherein said at least one resonant sensor modulates said second light source;

reflecting said second light source;

filtering said reflected light source to filter out said first light source;

detecting said modulated frequency of said second light source.

* * * * *